Figure 1:
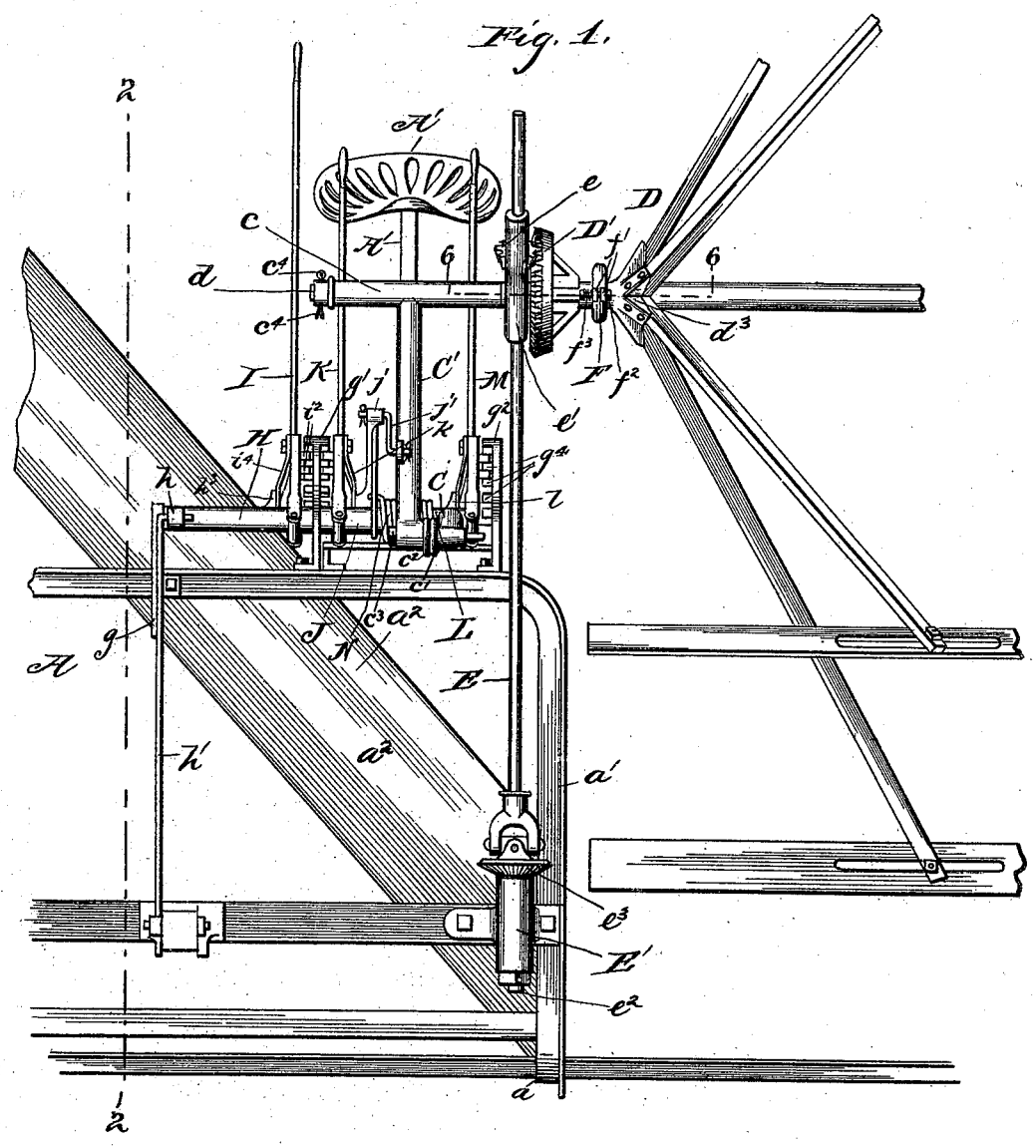

(No Model.) 3 Sheets—Sheet 1.
B. F. STEWART.
HARVESTER REEL.

No. 554,382. Patented Feb. 11, 1896.

Witnesses
W. E. Corliss
Martin H. Olsen

Inventor
Benjamin F. Stewart
By Coburn & Thacher
Atty's (No Model.) 3 Sheets—Sheet 2.
B. F. STEWART.
HARVESTER REEL.
No. 554,382. Patented Feb. 11, 1896.
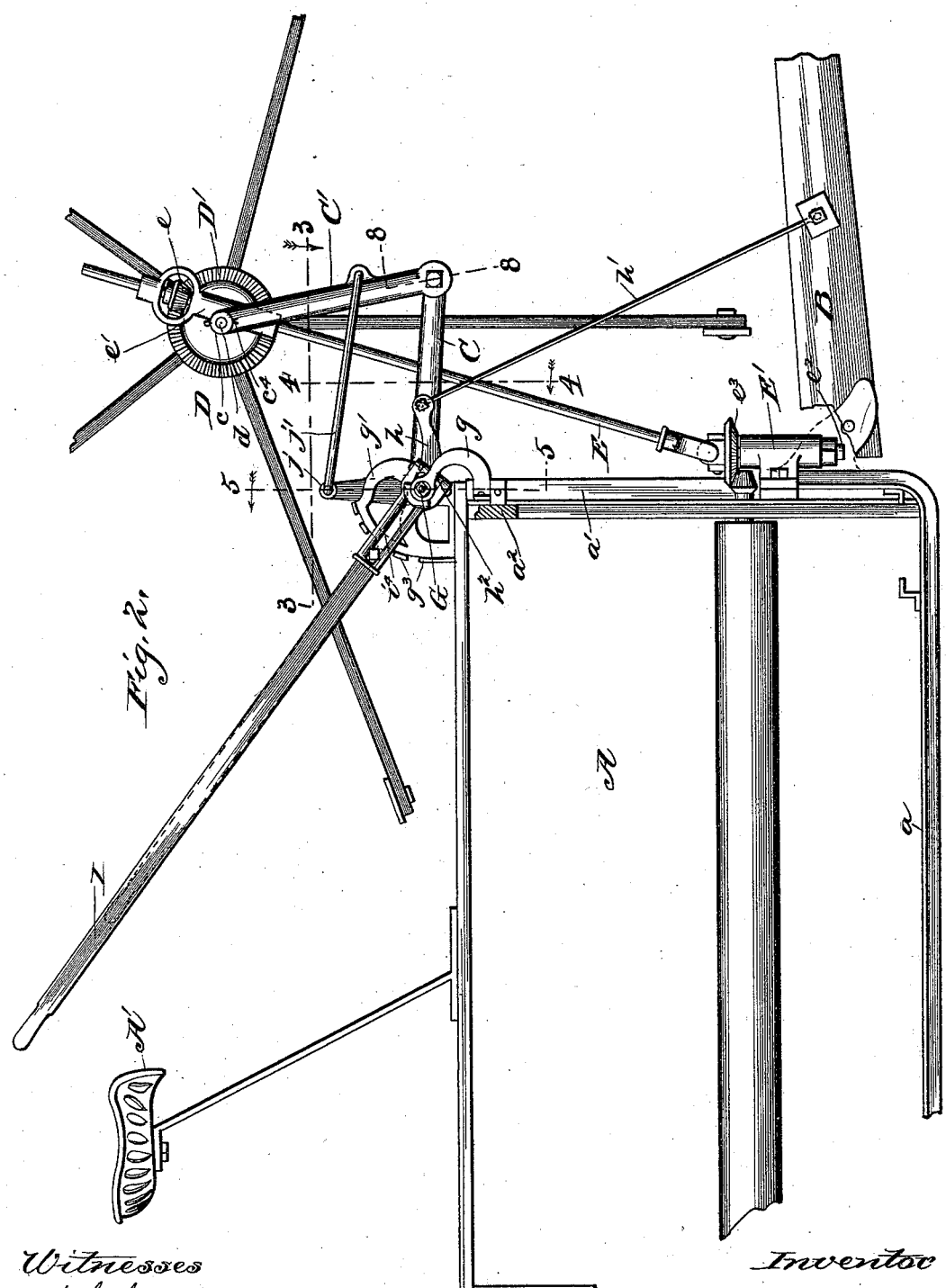
Witnesses
W. C. Corliss
Martin H. Olsen
Inventor
Benjamin F. Stewart
By Coburn & Thacher
Attys

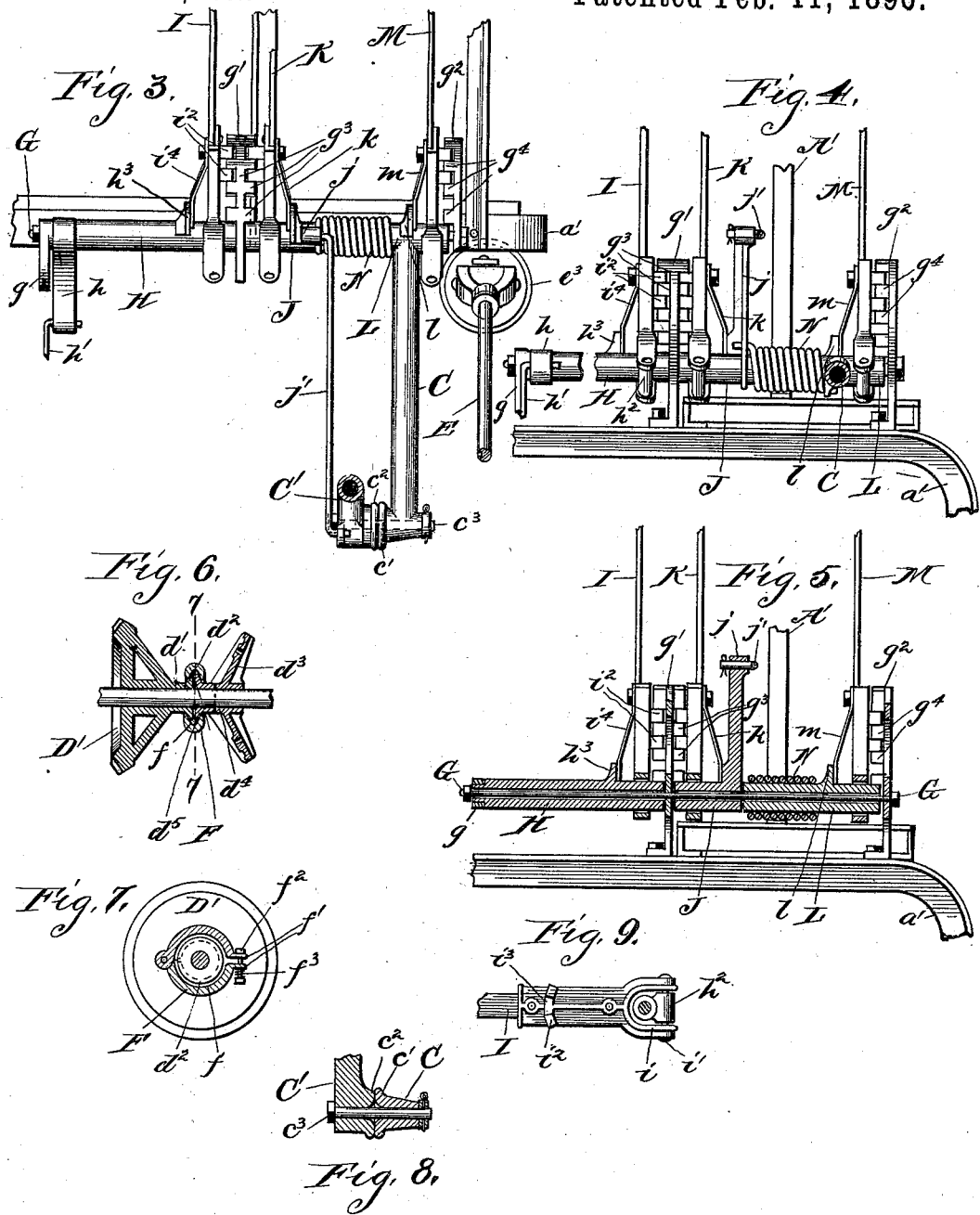

UNITED STATES PATENT OFFICE.

BENJAMIN F. STEWART, OF PLANO, ILLINOIS.

HARVESTER-REEL.

SPECIFICATION forming part of Letters Patent No. 554,382, dated February 11, 1896.

Application filed July 18, 1891. Serial No. 399,921. (No model.)

*To all whom it may concern:*

Be it known that I, BENJAMIN F. STEWART, a citizen of the United States, residing at Plano, in the county of Kendall and State of Illinois, have invented certain new and useful Improvements in Harvester-Reels, which are fully set forth in the following specification, reference being had to the accompanying drawings, in which—

Figure 1 represents a front elevation of so much of a harvester as is necessary to show the mounting of the reel; Fig. 2, a cross-section of the same taken on the line 2 2 of Fig. 1; Fig. 3, a detail plan section taken on the line 3 3 of Fig. 2; Fig. 4, a detail section taken on the line 4 4 of Fig. 2; Fig. 5, a detail section taken on the line 5 5 of Fig. 2; Fig. 6, a detail section taken on the line 6 6 of Fig. 1; Fig. 7, a detail section taken on the line 7 7 of Fig. 6; Fig. 8, a detail section taken on the line 8 8 of Fig. 2, and Fig. 9 a detail side elevation of one of the adjusting-levers. Figs. 1 and 2 are upon one scale. The remaining figures are upon an enlarged scale, but the same for each.

My invention relates to reels for harvesting-machines of that type in which the reel has a double adjustment—that is, an adjustment both vertical and horizontal—and which is usually accomplished by mounting the reel on a double-jointed support.

The invention consists in certain improvements in the devices for mounting and adjusting the reel.

I will proceed to describe in detail the construction and operation of mechanism in a harvester, whereby I have embodied my invention in one practical way, and will then point out more definitely in claims the particular improvements which I believe to be new and wish to secure by Letters Patent.

The main portions of the harvester may be of any ordinary construction. They will not be particularly described here, and will only be referred to as may be necessary for an understanding of the present invention.

In the drawings, A represents the main frame of a harvester, $a$ being the platform, $a'$ the upright portion of the frame, and $a^2$ the inclined elevator-frame. The pole B is hinged to the frame at its front end, as seen in Fig. 2, and a driver's seat A' is mounted upon the upright frame in convenient position for the driver to handle the machine. The reel-support consists of two arms C C' jointed together and the former or lower one jointed or hinged to a suitable support on the main frame, as will be presently described.

The upper or outer arm, C', is provided at its extremity with a long horizontal sleeve or tube $c$, and the shaft $d$ of the reel D is mounted in this sleeve, so as to freely turn therein. The reel is driven by any ordinary device. As shown in the drawings, it consists of a tumbling-shaft E, carrying on its upper end a sliding pinion $e$, feathered to the shaft and arranged to engage with a gear-wheel D' on the reel-shaft. A sleeve $e'$ is also fitted to the tumbling-shaft and mounted loosely on the reel-shaft, and the tumbling-shaft slides through the sleeve to permit any adjustment of the reel required. The sleeve also embraces the sliding pinion, so as always to retain it in its proper relation to engage with the gear on the reel-shaft. As seen in Figs. 1 and 2, this sleeve $e'$ is hung loosely at one side on the reel-shaft and passes up at one side of the latter. The sleeve is, therefore, on a secant line relatively to the gear-wheel D' instead of a diametrical line, as is usually the case. This enables me to bring the gearing for driving the reel nearer to the reel itself, for where the driving-shaft is arranged diametrically of the gear on the reel-shaft obviously the two parts must be located at the extreme end of the reel-shaft. In the present arrangement, however, it may be located anywhere along the reel-shaft, as shown in the drawings, in which this gearing is carried outward and located close to the reel, bringing the gearing close to the main resistance and so lessening the strain. It will be obvious that in this arrangement described and shown the gear-wheel D' and the pinion $e$ must be slightly skewed.

The tumbling-shaft is driven by suitable gearing on the main frame; but this general driving mechanism is old and no part of my present invention.

The gear-wheel D' is loose on the reel-shaft and is clutched to the latter by a friction device which I will now describe. The wheel is provided with a sleeve $d'$, extending outward and inclosing the shaft and terminating at its outer end in a circumferential flange $d^2$, having its inner face inclined, as seen in Fig. 6. The reel-spider $d^3$ is fastened, as usual, to the reel-shaft, but is provided with a sleeve $d^4$, extending inward along the shaft and terminating in a circumferential flange $d^5$, corresponding to the flange on the gear and having a similar incline on its inner face. These two flanges are arranged to abut against each other, thus forming frictional surfaces, and are held together by a friction band or ring F, made in two pieces, hinged together at one end and constructed with an interior V-shaped groove $f$, which is adapted to receive the V-shaped projection or collar formed by the two flanges when brought together, as seen in Fig. 6.

The ring is adapted to be clasped around the said joined flanges and the two sections at their outer ends are turned outward to provide tips or lugs $f'$, whereby they may be fastened together by means of a bolt $f^2$ passing through them, as seen in Fig. 7. The bolt is longer than necessary for a simple fastening device and is provided with a spring $f^3$, surrounding one end, whereby the fastening is made elastic. It will be seen that this furnishes a friction-clutch device, whereby the gear-wheel is connected to the reel-shaft, and that this clutch is yielding and also has an adjustable tension device, whereby it may be regulated as desired. The purpose of this construction is to prevent the breaking of the reel if it strikes an obstruction, the tension of the clutch being regulated so that while sufficient to rotate the reel in normal conditions it will yield when an obstruction is met to permit the revolution of the gear-wheel about the reel-shaft without turning the latter.

A shaft or rod G is mounted in suitable supports $g$ $g'$ $g^2$ at the front of the upright frame of the harvester. The first of these supports, $g$, is a bent arm fastened at its lower end to the front portion of the frame, as seen in Fig. 2. The second or central one, $g'$, is fastened to the upper side of the frame and is also carried upward over the back of the shaft to form a sector-plate which is provided with lugs $g^3$, forming notches on each side of the plate. The third, $g^2$, is at the other extremity of the shaft fastened as the middle support and like it carried upward and backward to form a sector-plate, but provided with lugs $g^4$ to form notches on the inside only. A sleeve-shaft H is mounted loosely on the rod G between the end support, $g$, and the central support, $g'$. This sleeve is provided with a stiff arm $h$, extending out in front, and a link-rod $h'$ connects the said arm with the pole, as seen in Fig. 2. Obviously the oscillation of this sleeve on its shaft will, therefore, tilt the main frame of the machine on the main axle in a well-known way. This oscillation is effected by means of a hand-lever I, which is connected to the sleeve in a peculiar way. At its inner end near the central support, $g'$, the sleeve is provided with a short lug $h^2$, as seen in Fig. 9. The lever I is forked at its lower end, so as to embrace the sleeve, and the arms $i$ of the fork extend forward beyond the sleeve sufficiently far to permit them to be pivoted to the said lug by means of a pivot pin or bolt $i'$, as seen in Fig. 9. The face of this portion of the lever next to the support $g$ is provided with a narrow transverse flange $i^2$, in which there is a notch $i^3$, adapted to engage with the projections on the sector-plate on that side of the support, and a spring $i^4$ is fastened at its upper end to the outer side of the lever, while its lower free end rests against a short lug $h^3$ on the sleeve, as seen in Fig. 4, thus serving to hold the lever into engagement with the notched sector-plate.

On the opposite side of the central support, $g'$, is a second sleeve J, which is provided with a fixed upright arm $j$, and this arm is connected by a link-rod $j'$ with the upper or outer arm, $C'$ of the reel-support, as seen in Fig. 2. Obviously the oscillation of this sleeve on the shaft will vibrate the said reel-support $C'$ to adjust the reel forward and back. This is effected by means of a lever K, which is constructed and pivoted to the sleeve J precisely the same as the lever I just described. It is also provided with a notch on one side to engage with the projections of the sector on that side of the support, and a spring $k$ operating to retain the lever in such engagement the same as already described. A third sleeve L is also mounted loosely on the shaft between the sleeve J and the end support, $g^2$. This sleeve forms the hinge or pivot of the lower or horizontal reel-support, C, which is made in one piece with or rigidly attached to the said sleeve and projects out in front thereof, as seen in Figs. 2 and 3. The oscillation of this sleeve will consequently vibrate this lower reel-support in a vertical direction to raise and lower the reel, and this vibration is accomplished by a lever M, which is constructed and pivoted to the sleeve about the same as in the case of the lever I. A spring $m$ is also applied to the lever to cause it to engage with the notched sector $g^4$, the same as with the other levers already described, the free end of the spring being retained by a suitable lug $l$ on the sleeve L. A spring N is wound or coiled around this sleeve L and is fastened at one end to the arm $j$ on the sleeve J and at the other end to the reel-supporting arm C, as seen in Figs. 3 and 4. This spring operates as a kind of equalizer in the adjustment of the reel. When the lever M is vibrated to throw the supporting-arm C downward to lower the reel, obviously it will strain the spring-coil tighter on the sleeve, and hence the spring will operate in opposition to this movement and so make it less abrupt and easier upon the reel mechanism, preventing any jerking or jarring. On the reverse movement obviously the spring will assist in lifting the arm and so lessen the force required at the lever.

It will be understood, of course, in this description that the lever K remains fixed in its adjustment. In vibrating this latter lever K to throw the reel in and out it will be seen that the tension of the spring is increased upon drawing the arm C' inward, thereby regulating this movement, as already described, while in moving the arm outward the spring is released and acts as a kind of positive force. The management of the reel is thus made very easy for the driver and also without shock to the devices.

It will be noticed that all three of the levers are mounted on the same short shaft, so that they have a common center of motion, and these levers are arranged so that they stand, in the average adjustment of the machine, about in the same plane and within the convenient reach of the driver upon his seat, as indicated in Figs. 1 and 2 of the drawings.

I construct the joint between the two reel-supporting arms C C' in a somewhat peculiar way. The arm C has upon its outer end an enlarged boss or head $c'$, standing across the arm, as seen in Fig. 3. The inner end of this head is flared or enlarged somewhat to provide a somewhat enlarged bearing-surface. The lower end of the arm C' is provided with a somewhat similar boss or head $c^2$, the outer face of which is constructed to correspond with the inner face of the head $c'$. The two heads are perforated and fastened together by means of an ordinary pivot-bolt $c^3$, as seen in Fig. 8. This provides a long strong joint at the point of connection between the two arms.

The reel D is mounted by inserting its shaft $d$ in the sleeve or tubular bearings $c$ on the arm C', and it is secured in position by a suitable key or pin $c^4$, inserted in the end of the shaft, as seen in Fig. 1. Now with this construction and with the arrangement of the driving-gears as already described and as seen in the said Fig. 1 the entire reel is readily removable from the machine simply by taking out this pin or key $c^4$, for the reel-shaft may then be readily withdrawn from its sleeve-bearing and at the same time from the sleeve $e$ on the tumbling-shaft. It will be seen that this entirely frees the upper end of the tumbling-shaft and the parts which it carries. This shaft is also made readily detachable at its lower end. It is there mounted in a suitable bracket E', fastened to the lower front portion of the frame. The lower section $e^2$ of the shaft is set down into and through this bracket and is secured by a nut, key, or any other suitable device at its lower end projecting through the bracket. The pinion $e^3$, by which the shaft is driven, is on this lower section, but arranged just above the bracket-bearing, as seen in Fig. 1. Hence by simply removing the fastening at the lower end of this section it can readily be lifted out from its bearing and so the entire shaft quickly detached from the machine when the upper end thereof is released from the reel-shaft, as already described, or by releasing the reel-shaft and also the lower end of this tumbling-shaft the two may be removed together. It will be seen, therefore, that the reel and its driving mechanism are readily and easily detachable from the machine whenever desired. The mode described above for connecting the several adjusting-levers to their sleeves enables me to dispense with the usual locking-latches and other like devices.

Changes may be made in some of the details of construction and arrangement herein shown and described, and I do not wish to be understood as limiting myself to all the particular details in the devices herein specified and shown.

Having thus described my invention, what I claim as new, and desire to secure by Letters Patent, is—

1. In a harvester, the supporting-arm, C', provided with the sleeve, $c$, in combination with the reel-shaft, $d$, mounted in said sleeve, a gear-wheel, D', secured to the reel-shaft and arranged thereon near the reel, the sleeve, $e'$, hung loosely on the reel-shaft and extending at one side of the latter on a secant line to the said gear, and the tumbling-shaft, E, mounted at its upper end loosely in said sleeve, and provided with a driving-pinion adapted to engage with the reel-gear, D', substantially as described.

2. The reel-driving tumbling-shaft E substantially upright in position, in combination with the bracket E', attached to the lower portion of the upright frame in which the lower section $e^2$ of said shaft is loosely and detachably set, the shaft-pinion $e^3$ on said section above the said bracket-bearing, and the reel-shaft to which the tumbling-shaft is loosely and detachably connected, substantially as described.

3. The reel-shaft, $d$, in combination with the gear-wheel D' mounted loosely thereon and provided with the inclined or beveled flange $d^2$, the reel-spider $d^3$ fastened to said shaft and provided with the like flange $d^5$, and the friction-band F, provided with a V-shaped groove $f$ and clasped around the said flanges with a yielding fastening, substantially as described.

4. In a harvester, an oscillating shaft as H, in combination with an operating-lever pivoted thereto by a pivot-pin arranged at right angles to the said shaft to permit lateral vibration, a notched sector-plate with which said lever is adapted to engage, and a retaining-spring to hold the lever laterally in said engagement, substantially as described.

5. An oscillating shaft H, provided with a lug $h^2$, in combination with operating-lever I, provided with a fork at its lower end the arms $i$ of which embrace the shaft and are pivoted to said lug, a notched sector-plate with which the lever directly engages, and a retaining-spring to hold it in said engagement, substantially as described.

6. A double-jointed reel-support, C C', in combination with the spring, N, coiled about the center of vibration of the arm, C, and connected at one end to the said arm, and at the other to the mechanism for adjusting the arm, C', substantially as described.

7. A double-jointed reel-support C C', in combination with the sleeves J and L mounted on a common shaft, the spring N coiled about the sleeve L and connected at one end to the arm C and at the other to an arm $j$ on the sleeve J, the link-rod $j'$, the adjusting-levers K, M, and devices for securing said levers at different points of adjustment, substantially as described.

BENJAMIN F. STEWART.

Witnesses:
CARRIE FEIGEL,
A. M. BEST.